(12) United States Patent
Silverbrook et al.

(10) Patent No.: US 7,576,775 B2
(45) Date of Patent: Aug. 18, 2009

(54) IMAGE PROCESSOR HAVING AN APPLICATION SPECIFIC INTEGRATED CIRCUIT FOR CAMERA MODULE

(75) Inventors: Kia Silverbrook, Balmain (AU); Simon Robert Walmsley, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 804 days.

(21) Appl. No.: 10/636,216

(22) Filed: Aug. 8, 2003

(65) Prior Publication Data

US 2004/0027457 A1    Feb. 12, 2004

Related U.S. Application Data

(63) Continuation of application No. 09/575,157, filed on May 23, 2000, now abandoned.

(30) Foreign Application Priority Data

May 25, 1999    (AU)    ..................... PQ0560

(51) Int. Cl.
    *H04N 5/225*    (2006.01)
(52) U.S. Cl. .................... 348/207.2; 348/373
(58) Field of Classification Search ............. 348/222.1, 348/207.2, 207.11, 207.1, 373, 372; 358/1.6
    See application file for complete search history.

(56) References Cited

U.S. PATENT DOCUMENTS

| | | | |
|---|---|---|---|
| 4,937,676 A | 6/1990 | Finelli et al. | |
| 5,146,328 A | 9/1992 | Yamasaki et al. | |
| 5,418,565 A | 5/1995 | Smith | |
| 5,493,332 A * | 2/1996 | Dalton et al. | ........... 348/207.99 |
| 6,005,613 A | 12/1999 | Endsley et al. | |
| 6,115,137 A * | 9/2000 | Ozawa et al. | ................ 358/1.6 |
| 6,128,446 A | 10/2000 | Schrock et al. | |
| 6,356,357 B1 * | 3/2002 | Anderson et al. | .......... 358/1.17 |

(Continued)

FOREIGN PATENT DOCUMENTS

WO    WO 99/04368    1/1999

OTHER PUBLICATIONS

Connoly C et al. "A study of efficiency and accuracy in the transformation from RGB to CIELAB color space" IEEE Transactions on Image Processing, Jul. 1997, IEEE, USA, vol. 6, No. 7, pp. 1046-1048, XP002240439 ISSN: 1057-7149.

(Continued)

*Primary Examiner*—Lin Ye
*Assistant Examiner*—Nelson D. Hernández Hernández

(57) ABSTRACT

An image processor for a camera module having an image sensor that captures an image for transfer to a printer module of a compact printer system including a capture unit that captures the image from the image sensor and transforms it to planarized linear RGB form.

The image processor also includes one or more interface units communicating with components of said camera module under control of the central processing unit and image processing units, being an application specific integrated circuits, in communication with said image storage memory to transform said image for transmission. A Serial Bus interface communicates with the Serial Bus of a compact printer system to transfer data and power between modules. In one application, the camera module captures an image, which is transferred to the image storage memory of a printer module for printing by a printhead.

12 Claims, 16 Drawing Sheets

U.S. PATENT DOCUMENTS

| | | |
|---|---|---|
| 6,583,820 B1 | 6/2003 | Hung |
| 6,642,956 B1 * | 11/2003 | Safai ........................ 348/222.1 |
| 6,654,051 B1 | 11/2003 | Fujita et al. |
| 2001/0001563 A1 * | 5/2001 | Tomaszewski .............. 348/552 |
| 2001/0019561 A1 * | 9/2001 | Staats ......................... 370/487 |
| 2002/0001032 A1 * | 1/2002 | Ohki .......................... 348/207 |
| 2002/0080247 A1 * | 6/2002 | Takahashi et al. ........... 348/229 |
| 2002/0176009 A1 | 11/2002 | Johnson et al. |

OTHER PUBLICATIONS

Kasson J M et al. "Performing Color Space Conversations with Three-Dimensional Linear Interpolation" Journal of Electronic Imaging, Spie + IS&T, US, vol. 4, No. 3, Jul. 1, 1995 pp. 226-249, XP000517861 ISSN: 1017-9909 *abstract*.

Parulski A et al. "High-Performance Digital Color Video Camera" Journal of Electronic Imaging, SPIE + IS&T, US, vol. 1, No. 1, 1992, pp. 35-45, XP000323326 ISSN: 1017-9909 *abstract*.

* cited by examiner

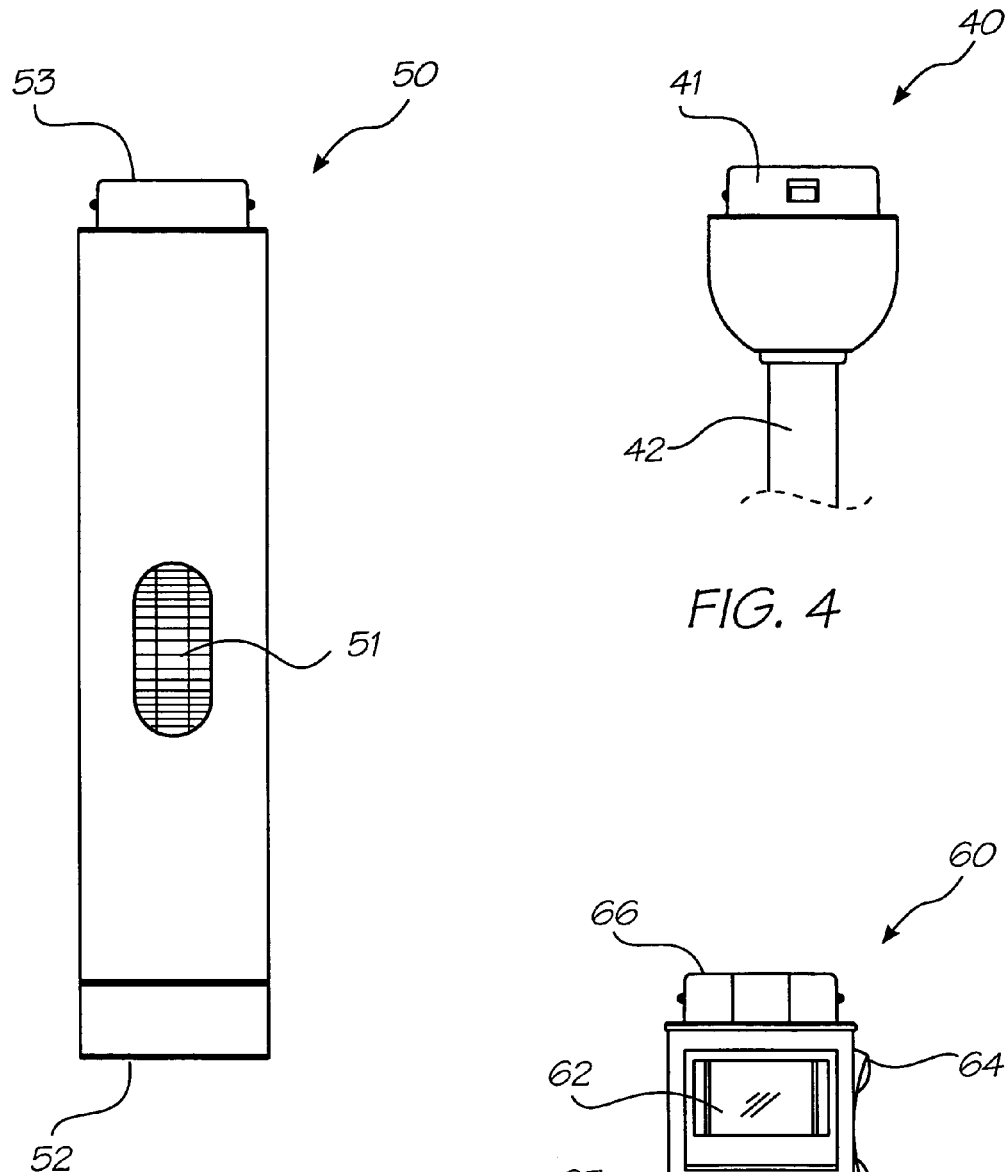

IMAGE PROCESSOR HAVING AN APPLICATION SPECIFIC INTEGRATED CIRCUIT FOR CAMERA MODULE

CROSS REFERENCES TO RELATED APPLICATIONS

The present application is a continuation of U.S. patent application Ser. No. 09/575,157 filed on May 23, 2000 now abandoned.

FIELD OF THE INVENTION

The invention relates to a compact printer system able to print full-color, business card size documents from a device about the size of a pen. The system includes various hot-connectable modules that provide a range of functions. In particular the invention relates to an image processor for a camera module.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| USSN | Title |
| --- | --- |
| 09/575,182 | Compact Color Printer Module |
| 09/575,173 | Modular Compact Printer System |
| 09/575,194 | Nozzle Capping Mechanism |
| 09/575,136 | Ink Cartridge for Compact Printer System |
| 09/575,119 | Controller for Printer Module |
| 09/575,135 | Camera Module for Compact Printer System |
| 09/575,166 | Memory Module for Compact Printer System |
| 09/575,134 | Effects Module for Compact Printer System |
| 09/575,121 | Effects Processor for Effects Module |
| 09/575,137 | Timer Module for Compact Printer System |
| 09/575,167 | Color Conversion Method for Compact Printer System |
| 09/575,120 | Method and Apparatus of Dithering |
| 09/575,122 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States Patent Applications filed simultaneously to the present application and hereby incorporated by cross reference:

| USSN | Title |
| --- | --- |
| 09/575,152 | Fluidic seal for an ink jet nozzle assembly |
| 09/575,141 | Ink jet printhead having a moving nozzle with an externally arranged actuator |
| 09/575,125 | Method of manufacture of an ink jet printhead having a moving nozzle with an externally arranged actuator |
| 09/575,176 | Ink jet printhead nozzle array |
| 09/575,147 | Nozzle guard for an ink jet printhead |

In order to construct a camera module for a compact printer system it is necessary to address the problem of control of the image capture and transformation process. Methods of very large scale integration and microelectronic manufacturing are known but have not been applied to the needs of a compact printer system. No suitable image processor exists for a camera module that connects directly to a printer module.

SUMMARY OF THE INVENTION

In one form, the invention resides in A method of image processing an image in a camera module having an image sensor recording an image, said method including the steps of:

capturing an image from said image sensor;
linearizing said image from said image sensor;
storing said image in image storage memory in a planarized linear RGB form;
transforming said image from planarized linear RGB form to L*a*b*; and
transmitting said L*a*b* form image on a bus of a compact printer system.

In another form, the invention resides in an image processor for a camera module having an image sensor that captures an image, said image processor comprising:

a central processing unit;
program memory associated with said central processing unit, said program memory storing program steps for execution by said central processing unit to operate said camera module to capture said image;
one or more interface units communicating with components of said camera module;
image storage memory storing said image;
an image capture unit in communication with said image storage memory, said central processing unit and said image sensor, said image capture unit capturing said image from said image sensor and storing said image in said image storage memory; and
image processing units, being application specific integrated circuits in communication with said image storage memory to transform said image for transmission; and
a serial bus interface communicating with a Serial Bus of a compact printer system.

Further features of the invention will be evident from the following description.

BRIEF DESCRIPTION OF THE DRAWINGS

In order to assist with describing preferred embodiments of the invention, reference will be made to the following figures in which:

FIG. 4 is a communication module;
FIG. 5 is a flash module;
FIG. 6 is a timer module.

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
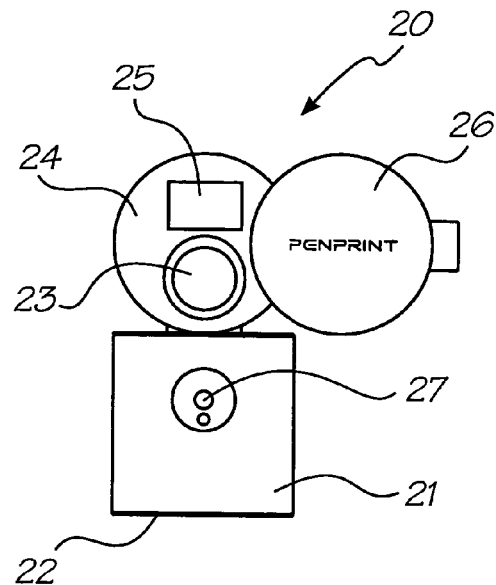
FIG. 2 is a camera module.
Figure 3:
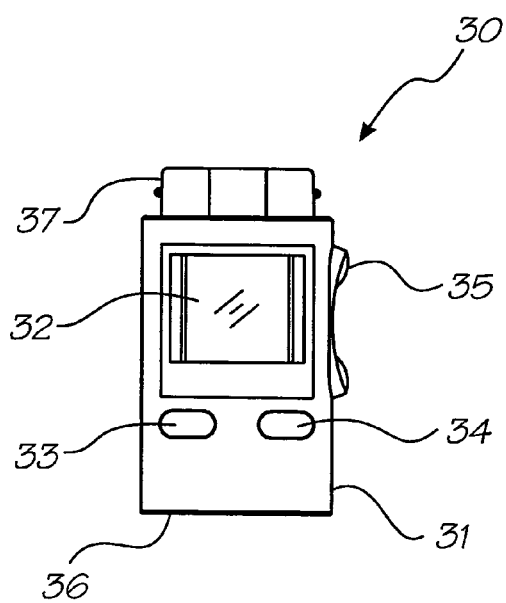
FIG. 3 is a memory module.
Figure 7:
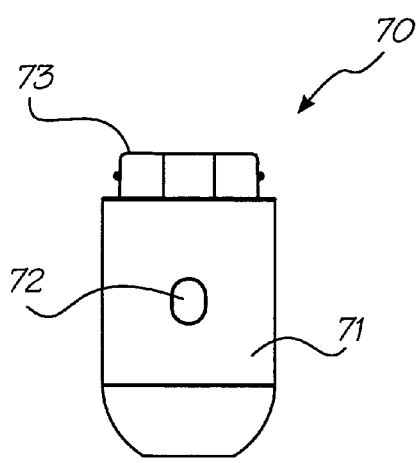
FIG. 7 is a laser module.

Compact printer modules can be grouped into three types:

image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;

housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
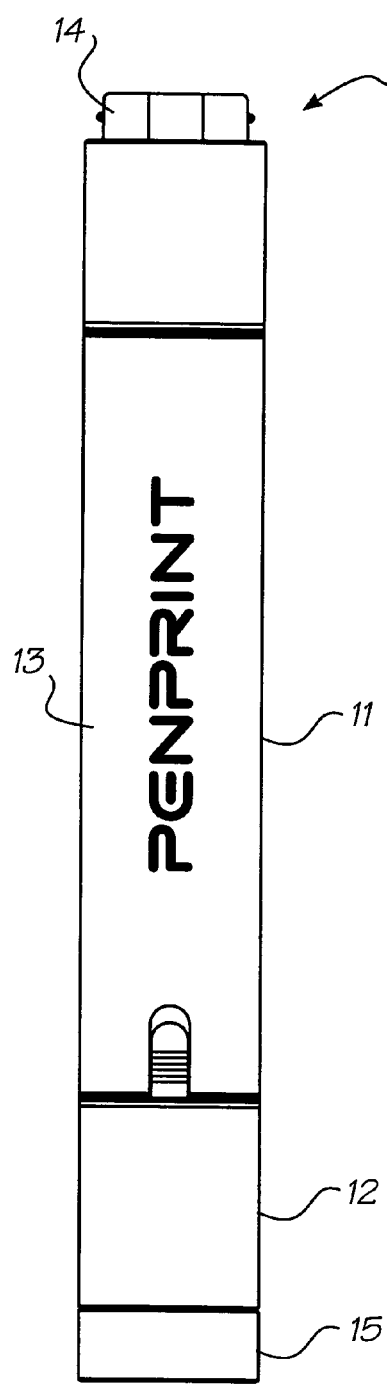
FIG. 1 is a printer module.

FIG. 1 shows a printer module that incorporates a compact printhead described in co-pending United States Patent Applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 µm in diameter, and spaced 15.875 µm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
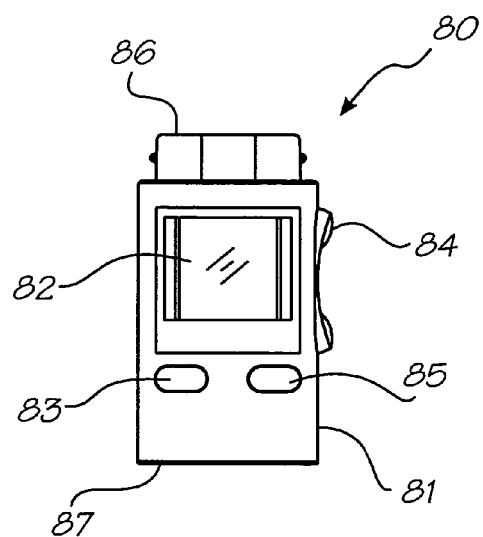
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
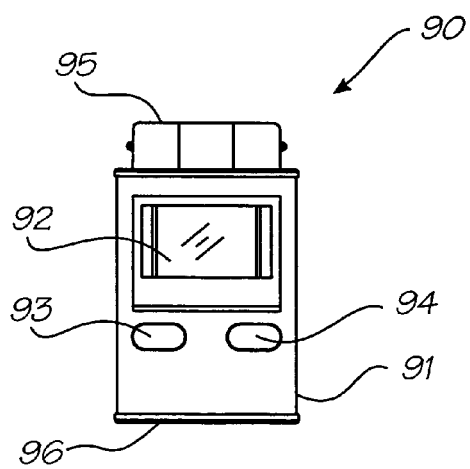
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
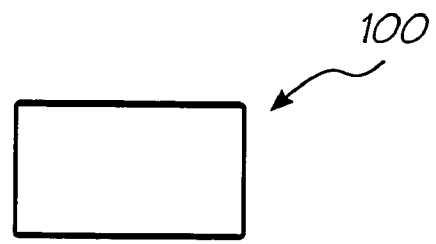
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
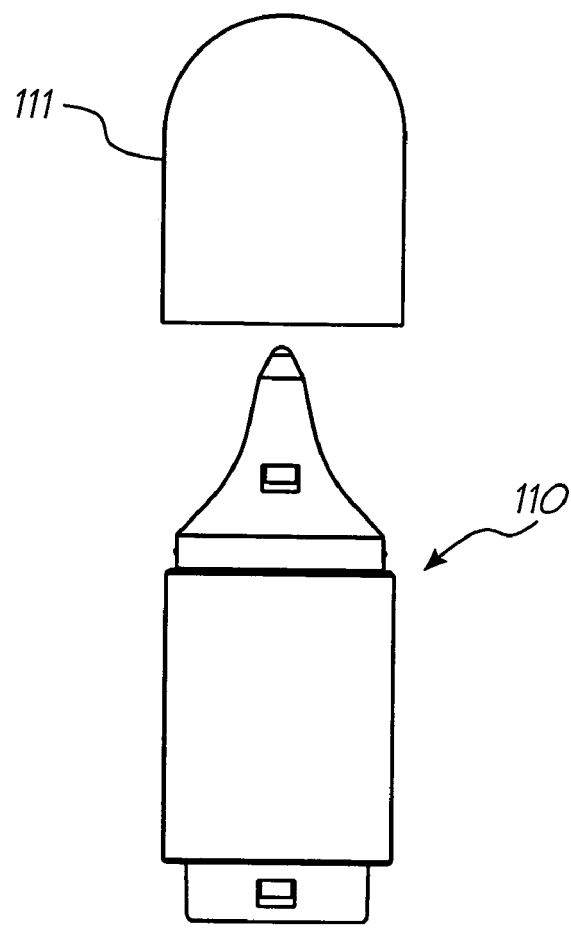
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
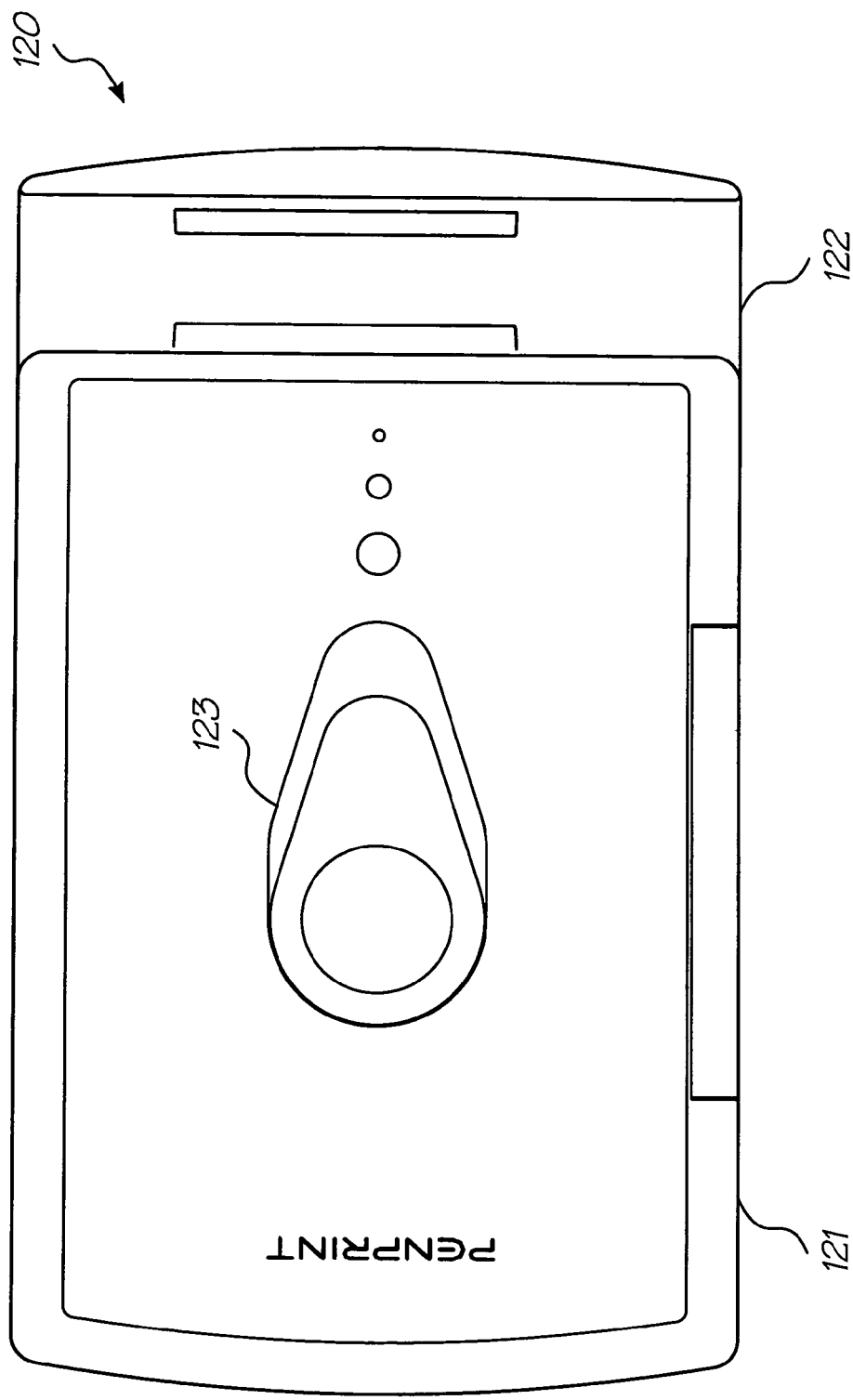
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
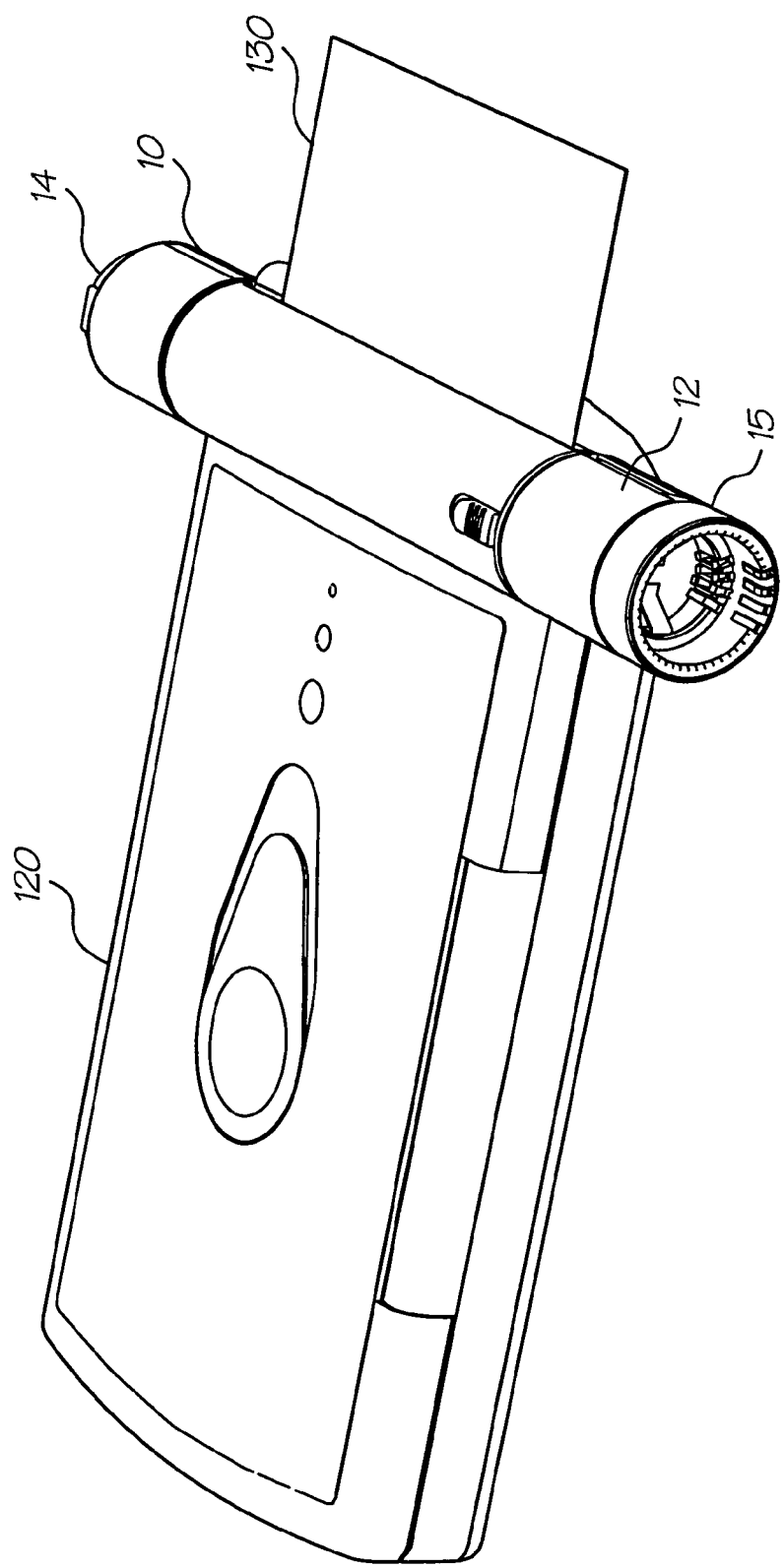
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
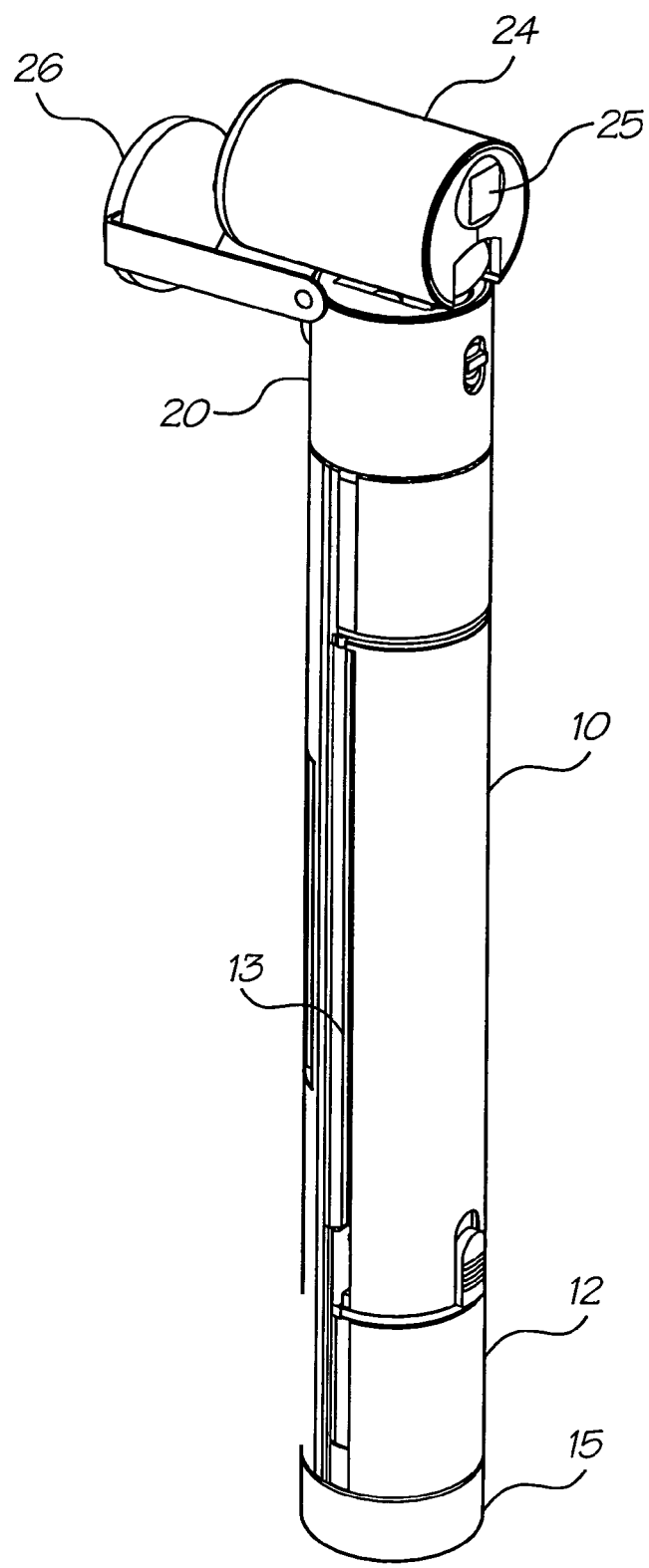
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
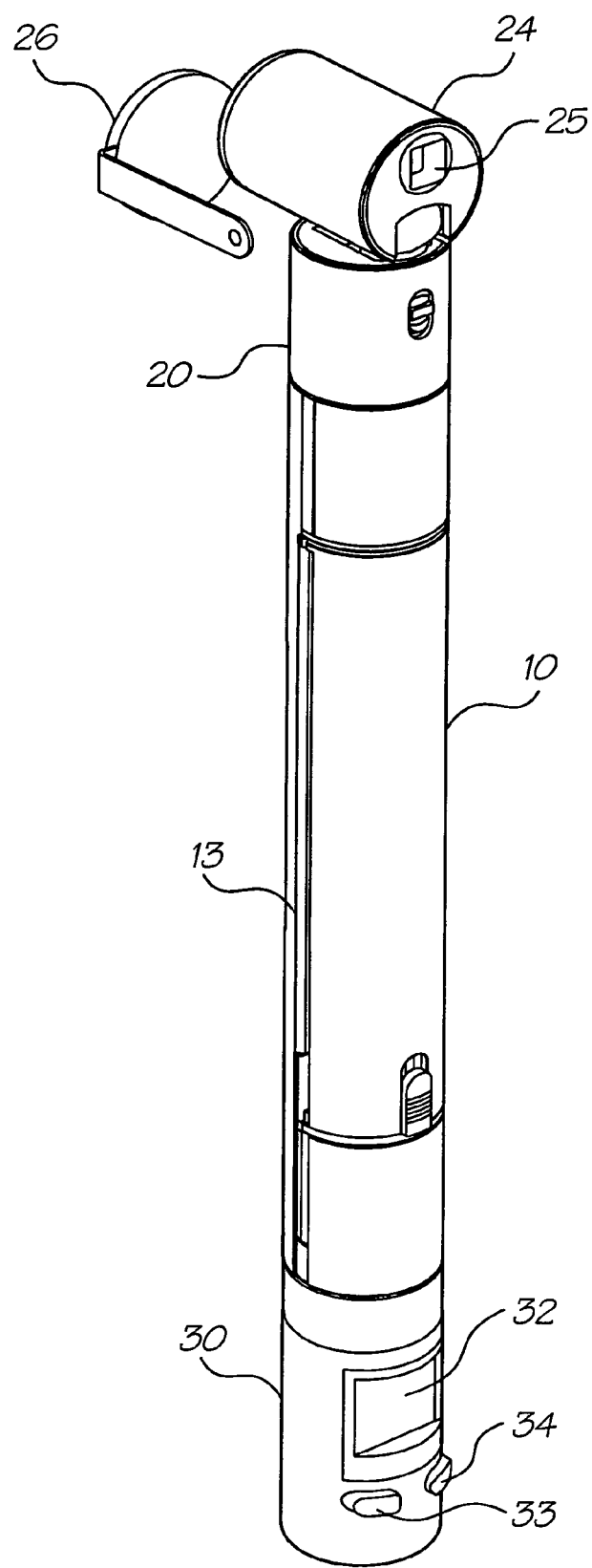
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
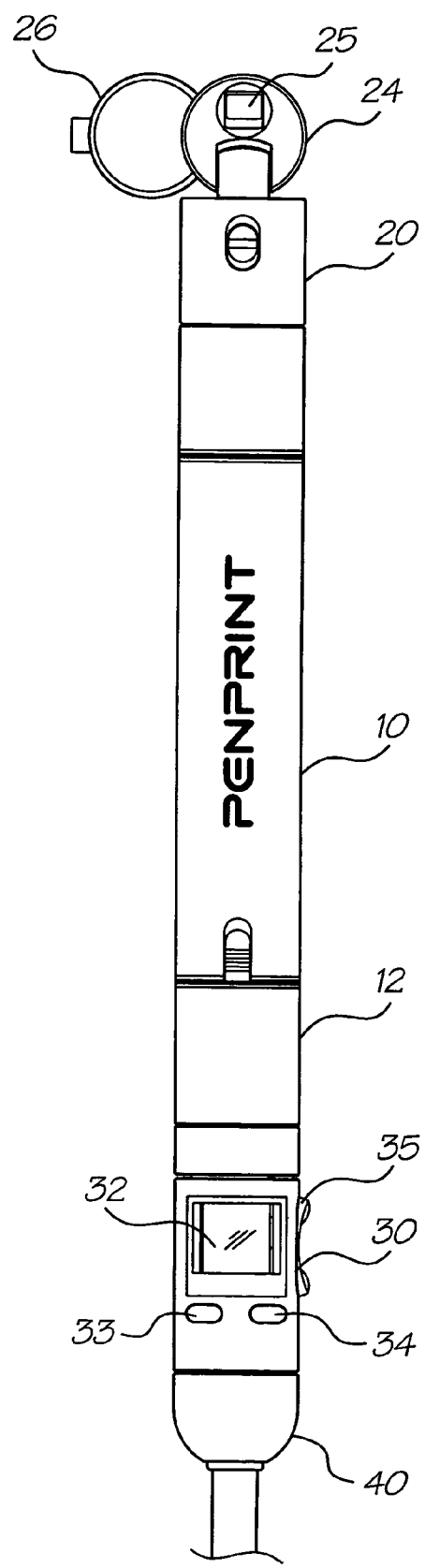
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

Figure 17:
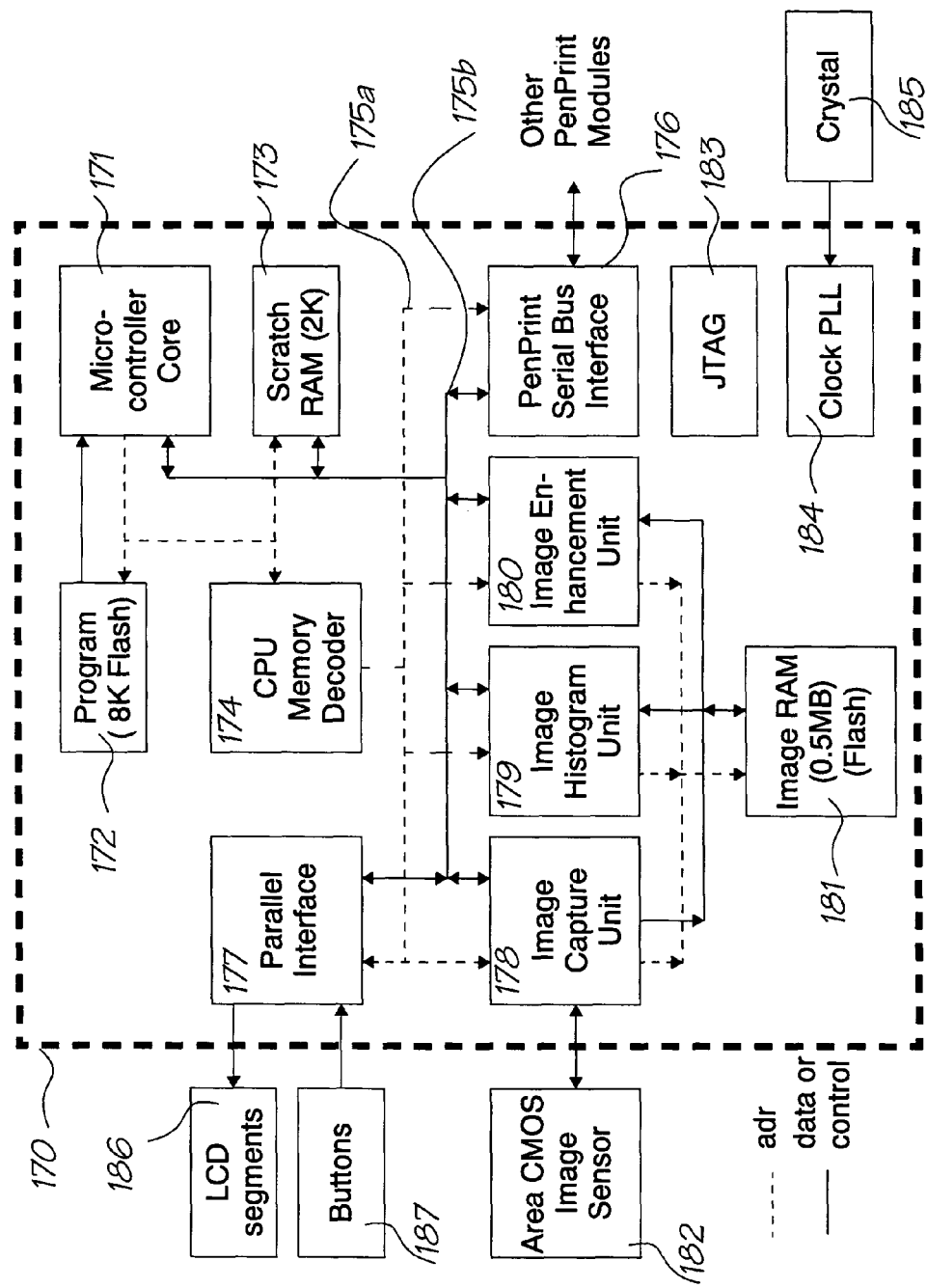
FIG. 17 is a block diagram of a controller for the camera module of FIG. 2.

As mentioned above, a camera, such as the camera module 20, acquires an image in RGB format but the printer module 10 prints the image in CMY format. The camera module includes an application specific integrated circuit configured as an image processor to collect an image from a CMOS image sensor and transforms the image to a format suitable for transmission to the image processor of the print module. FIG. 17 shows a schematic of the image processor 170. Each element of the controller is described in detail below together with examples of operation of the elements.

The image processor 170 is designed to be fabricated using a 0.25 micron CMOS process, with approximately 4 million transistors, almost half of which are flash memory or static RAM. This leads to an estimated area of 8 $mm^2$. The image processor contains:

a CPU/microcontroller core;

program storage memory, which is suitably 8 Kbytes of flash memory;

program variable storage, which is suitably 2 KByte of RAM;

image processing units, including an image capture unit, image histogram unit and an image enhancement unit;

a Serial Bus Interface;

a parallel interface;

The image processor may also include a number of housekeeping and administration elements including;

image storage RAM, which is suitably multi-level Flash memory;

a memory decoder;

a clock; and a joint test action group (JTAG) interface.

The image processor is intended to run at a clock speed of approximately 24 MHz on 3V externally and 1.5V internally to minimize power consumption. The actual operating frequency will be an integer multiple of the Serial Bus operating frequency. The CPU is intended to be a simple micro-controller style CPU, running at about 1 MHz, and can be a vendor supplied core.

The image processor incorporates a simple micro-controller CPU core 171 to synchronize image capture and printing image processing chains and to perform general operating system duties. A wide variety of CPU cores are suitable, it can be any processor core with sufficient processing power to perform the required calculations and control functions fast enough to meet consumer expectations.

Since all of the image processing is performed by dedicated hardware, the CPU does not have to process pixels. As a result, the CPU can be extremely simple. An example of a suitable core is a Philips 8051 micro-controller running at about 1 MHz.

Associated with the CPU Core 171 is a Program ROM 172 and a small Program Scratch RAM 173. The CPU 171 communicates with the other units within the image processor via memory-mapped I/O supported by a Memory Decoder 174. Particular address ranges map to particular units, and within each range, to particular registers within that particular unit. This includes the serial interface 176 and parallel interface 177 described below.

The CPU Memory Decoder 174 is a simple decoder for satisfying CPU data accesses. The Decoder translates data addresses into internal register accesses over the internal low speed bus 175, and therefore allows for memory mapped I/O of image processor registers. The bus 175 includes address lines 175a and data or control lines 175b.

The small Program Flash ROM 172 is incorporated into the image processor to store simple sequences for controlling the operation of the image processor 170. The ROM size depends on the CPU chosen, but should not be more than 8 Kbytes.

Likewise, a small scratch RAM 173 is incorporated into the image processor for, primarily, program variable storage. Since the program code does not have to manipulate images, there is no need for a large scratch area. The RAM size depends on the CPU chosen (e.g. stack mechanisms, subroutine calling conventions, register sizes etc.), but should not be more than about 2 Kbytes The Serial Bus interface 176, is connected to the internal chip low-speed bus 175. The Serial Bus is controlled by the CPU 171 and preferably follows the USB protocol, although other protocols may be suitable. The maximum speed on the bus is 12 MBits/sec, although the maximum effective data transfer rate is 8 MBits/sec due to protocol overhead and transmission redundancy. The Serial Bus is used to transmit commands and images between the various modules of the compact printer system and is described in a co-pending application titled Modular Compact Printer System.

Since the image processor 170 is responsible for transmitting an image to the Printer Module 10, the transmission timing considerations are required for image processing parameters. The time taken to transmit a complete image (850×534 L*a*b*) is 1.36 seconds (850×534×3×8/8,000,000).

The parallel interface 177 connects the image processor to individual static electrical signals, such as LCD segments 186 and buttons 187 (eg. self timer). The CPU 171 is able to control each of these connections as memory-mapped I/O via the low-speed bus 175. The following table shows the connections to the parallel interface.

| Connections to Parallel Interface | | |
| --- | --- | --- |
| Connection | Direction | Pins |
| "Take" button | In | 1 |
| Timer on/off switch | In | 1 |

A standard JTAG (Joint Test Action Group) Interface 183 may be included in the image processor for testing purposes. Due to the complexity of the chip, a variety of testing techniques are required, including BIST (Built In Self Test) and functional block isolation. An overhead of 10% in chip area is assumed for overall chip testing circuitry.

The image processor 170 may also include a clock phase-locked loop 184 that provides timing signals to the controller. The clock 184 draws a base signal from crystal oscillator 185. Some CPU include a clock so the clock 184 and crystal 185 may not be required.

An Image Storage Memory 181 is used to store a captured image obtained from the image sensor 182 via the image capture unit 178. It is suitably analog multi-level Flash RAM (4-bits per cell) so that the image is retained after the power has been shut off. The Image Storage Memory is referred to as ImageRAM for convenience Although Flash memory is not required, multilevel Flash memory requires fewer gates than RAM, and the use of 16-level Flash (4-bit per cell) is possible as the occasional bit error in the image is not fatal (compared to program code).

The image is written to ImageRAM 181 by the Image Capture Unit 178, and read by image processing units which are suitably an Image Histogram Unit 179 and the Image Enhancement Unit 180. The Image Histogram Unit 179 and the Image Enhancement Unit 180 could be embodied in a single image processing unit but the inventors find that it is convenient conceptually to treat the processes performed by each unit separately. The CPU 171 does not have direct random access to this image memory.

Figure 18:
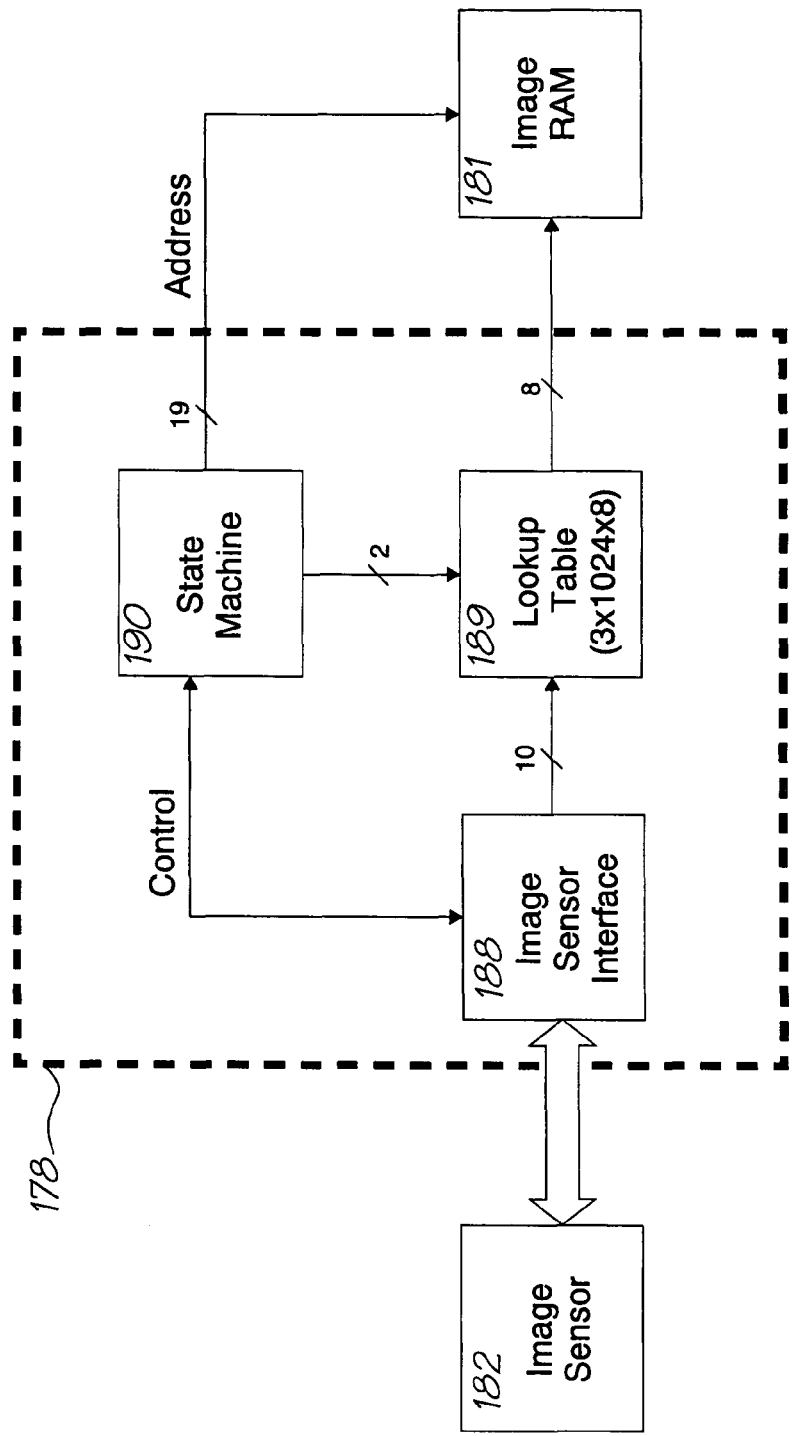
FIG. 18 is a block diagram of the image capture unit.

The Image Capture Unit 178 accepts pixel data from the image sensor 182 via an Image Sensor Interface 188, linearizes the RGB data via a lookup table 189, and finally writes the linearized RGB image to ImageRAM 181 in planar format. The process is shown in FIG. 18.

The total amount of memory required for the planarized linear RGB image is 500,000 bytes (approximately 0.5 MB) arranged as follows:

| | |
| --- | --- |
| R: 425 × 267 = | 113,475 bytes |
| B: 425 × 267 = | 113,475 bytes |
| G: 425 × 537 = | 226,950 bytes |

The Image Sensor Interface (ISI) 188 is a state machine that sends control information to the external CMOS Image Sensor 182, including frame sync pulses and pixel clock pulses in order to read the image. The ISI may be a sourced cell from the image sensor manufacturer. The ISI is controlled by an Image Capture Unit State Machine 190.

Although a variety of image sensors are available, only the Bayer color filter array (CFA) is considered here by way of example. Persons skilled in the art will be able to readily extend the invention to other image sensor formats.

The image captured by the CMOS sensor (via a taking lens) is assumed to have been sufficiently filtered so as to remove any aliasing artifacts. The sensor itself has an aspect ratio of approximately 3:2, with a resolution of 850×534 samples. The most likely pixel arrangement is the Bayer color filter array (CFA), with each 2×2 pixel block arranged in a mosaic of one red pixel, one blue pixel, and two green pixels on a diagonal of the pixel block.

Each contone sample of R, G, or B (corresponding to red, green, and blue respectively) is 10-bits. Note that each pixel of the mosaic contains information about only one of R, G, or B. Estimates of the missing color information must be made before the image can be printed.

The CFA is considered to perform some amount of fixed pattern noise (FPN) suppression. Additional FPN suppression may required.

The image sensor is unlikely to have a completely linear response. Therefore the 10-bit RGB samples from the CFA must be considered to be non-linear. These non-linear samples are translated into 8-bit linear samples by means of a lookup table (one table per color). The lookup table 189 is a ROM mapping the sensor's RGB response to a linear RGB. As such, the ROM is 3 KBytes (3×1024×8-bits). Ten bits of address come from the ISI, and two bits of TableSelect are generated by the Image Capture Unit's State Machine 190.

The Image Capture Unit's State Machine 190 generates control signals for the Image Sensor Interface, and generates addresses for linearizing the RGB and for planarizing the image data.

The control signals sent to the ISI inform the ISI to start capturing pixels, stop capturing pixels etc.

The 2-bit address sent to the Lookup Table matches the current line being read from the ISI. For even lines (0, 2, 4 etc.), the 2-bit address is Red, Green, Red, Green etc. For odd lines (1, 3, 5 etc.), the 2-bit address is Green, Blue, Green, Blue. This is true regardless of the orientation of the camera.

A 21-bit address is sent to the Image RAM as the write address for the image. Three registers hold the current address for each of the red, green, and blue planes. The addresses increment as pixels are written to each plane.

The Image Capture Unit contains a number of registers which are summarized in the following table.

Registers in Image Capture Unit

| Name | Bits | Description |
| --- | --- | --- |
| MaxPixels | 10 | Number of pixels each row |
| MaxRows | 10 | Number of rows of pixels in image |
| CurrentPixel | 10 | Pixel currently being fetched |
| CurrentRow | 10 | Row currently being processed |
| NextR | 19 | The address in Image RAM to store the next Red pixel. Set to start address of red plane before image capture. After image capture, this register will point to the byte after the red plane. |
| NextG | 19 | The address in Image RAM to store the next Green pixel. Set to start address of green plane before image capture. After image capture, this register will point to the byte after the green plane. |
| NextB | 19 | The address in Image RAM to store the next Blue pixel. Set to start address of blue plane before image capture. After image capture, this register will point to the byte after the blue plane. |
| EvenEven | 2 | Address to use for even rows/even pixels |
| EvenOdd | 2 | Address to use for even rows/odd pixels |
| OddEven | 2 | Address to use for odd rows/even pixels |
| OddOdd | 2 | Address to use for odd rows/odd pixels |
| Go | 1 | Writing a 1 here starts the capture. Writing a 0 here stops the image capture. A 0 is written here automatically by the state machine after MaxRows of MaxPixels have ben captured. |

In addition, the Image Sensor Interface 188 will contain a number of registers. The exact number of registers will depend on the Image Sensor chosen.

The Image Histogram Unit (IHU) 179 is designed to generate histograms for planar format images with samples of eight bits each. The Image Histogram Unit is typically used three times per print. Three different histograms are gathered, one per color plane. Each time a histogram is gathered, the results are analyzed in order to determine the low and high thresholds, scaling factors etc. for use in the remainder of the print process. Suitable histogram processes will be known to persons skilled in the art.

The histogram itself is stored in a 256-entry RAM, each entry being 18 bits. The histogram RAM is only accessed from within the IHU. Individual entries are read from and written to as 18-bit quantities.

Figure 19:
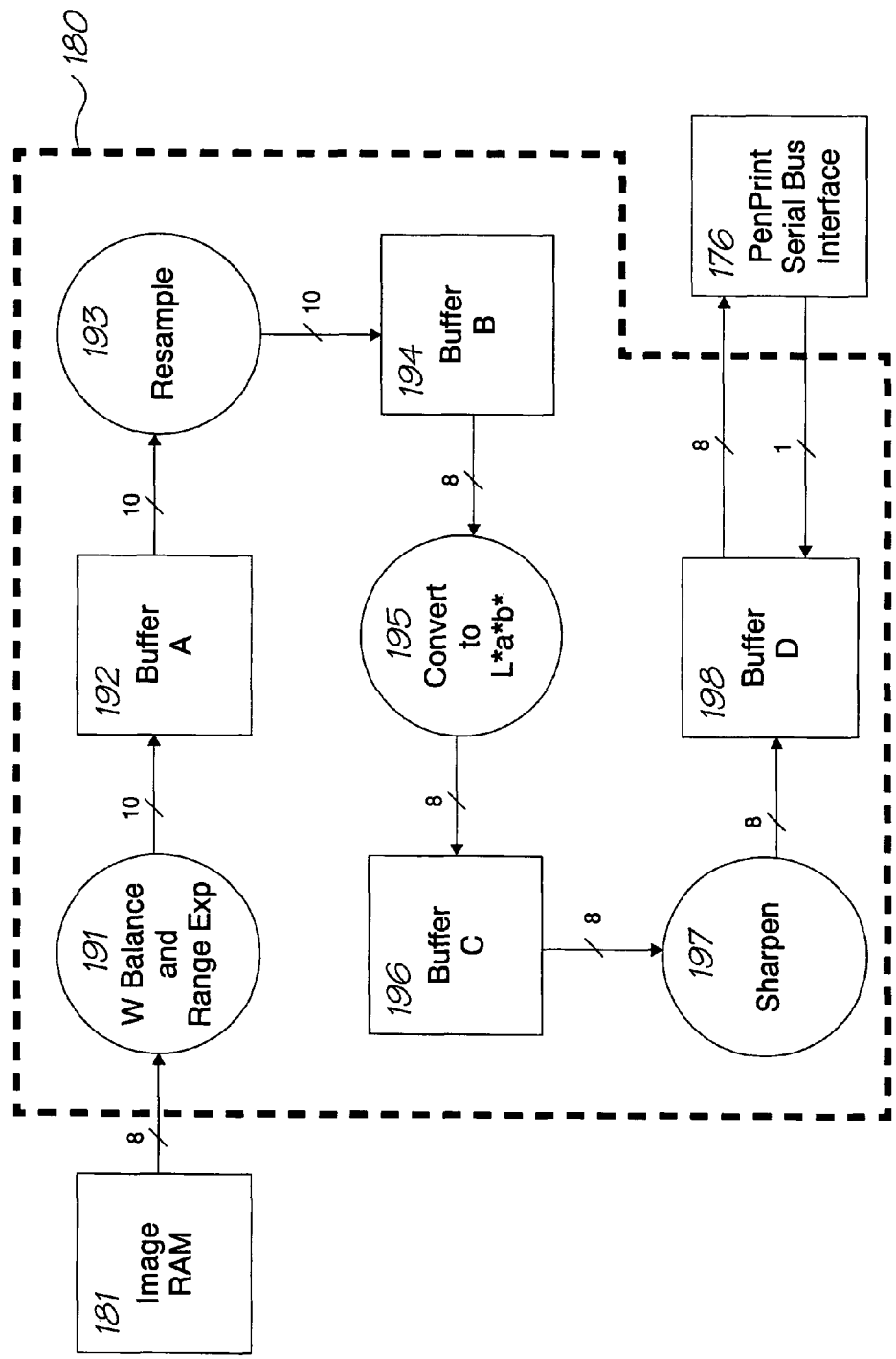
FIG. 19 is a block diagram of the image enhancement unit.

The Image Enhancement Unit (IEU) 180 provides the interface between the Image RAM 181 and the Serial Bus Interface 176, as shown in FIG. 19. The IEU takes a planarized linear RGB obtained from a CFA format captured image from the ImageRAM, and produces a fully populated L*a*b* image of resolution 850×534 for subsequent transmission to the Printer Module 10 via the Serial Bus Interface 176.

The image enhancement process includes the following functions:
Gather Statistics;
Rotate Image;
White Balance and Range Expansion;
Resample;
Convert to L*a*b*.
Sharpen;

The IEU 180 performs all of these functions with the exception of Gather Statistics. To perform the Gather Statistics step, the CPU calls the Image Histogram Unit 179 three times (once per color channel), and applies simple thresholding algorithms.

In terms of speed, the IEU is producing data for the Serial Bus Interface. Given that the Serial Bus Interface transmits at an effective rate of 8 MHz, and the image processor 170 runs at 24 MHz, it takes the serial interface 72 cycles to transmit the 24 bits for each pixel (3 colors @ 8 bits per color @ 3 cycles to transfer each bit). The IEU therefore has 72 cycles to produce each L*a*b* triplet.

The IEU performs the four processes shown in FIG. 19 in parallel. The first process performs White Balance and Range Expansion. The second process performs Resampling. The third performs color conversion, and the fourth performs sharpening. The output from the IEU is directly sent to the Serial Bus Interface for transmission to the Printer Module.

The processes are connected via buffers, each typically only a few bytes. The structure of the IEU is shown in FIG. 19. The buffer sizes are summarized in the following table.

Buffer sizes for Image Enhancement Unit

| Buffer | Size (bytes) | Composition of Buffer |
|---|---|---|
| Buffer A | 172.5 | Red Buffer = 6 lines of 6 entries @ 10-bits each = 45 bytes |
| | | Blue Buffer = 6 lines of 6 entries @ 10-bits each = 45 bytes |
| | | Green Buffer = 11 lines of 6 entries @ 10-bits each = 82.5 bytes |
| Buffer B | 22.5 | 2 sets of 3 RGB pixels = 2 × 3 × 3 entries @ 10-bits each = 180 bits |
| Buffer C | 20 | 5 × 4 RAM |
| | | 3 lines of 4 entries of L @ 8-bits each = 12 bytes |
| | | 2 colors × 4 entries @ 8-bits each = 8 bytes |
| Buffer D | 6 | 2 L*a*b* pixels = 2 × 3 entries @ 8-bits each = 6 bytes |

The task of loading Buffer A 192 from the ImageRAM 181 involves the steps of white balance and range expansion 191. The pixels must be produced for Buffer A fast enough for their use by the Resampling process. This means that during a single group of 72 cycles, this unit must be able to read, process, and store 6 red pixels, 6 blue pixels, and 11 green pixels.

Once a given pixel has been read from the appropriate plane in the image store, it must be white balanced and its value adjusted according to the range expansion calculation defined as:

Pixel'=(Pixel−Low Threshold)×RangeScaleFactor where RangeScaleFactor=256/(HighThreshold−LowThreshold)

Figure 20:
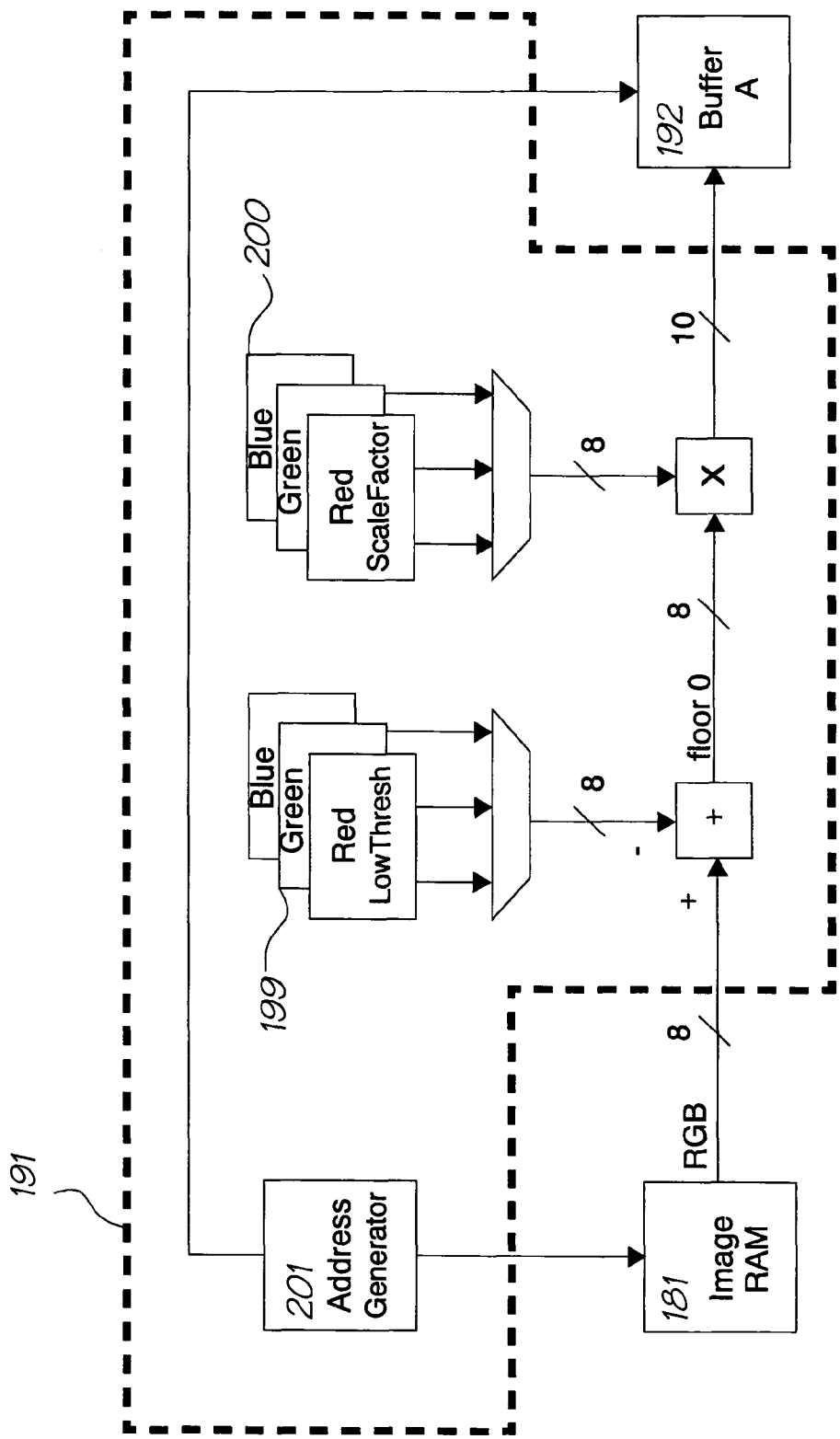
FIG. 20 is a block diagram of the white balance and range expansion process.

The process simply involves a single subtraction (floor 0), and a multiply (255 ceiling), both against color specific constants. The structure of this unit is shown in FIG. 20.

The red, green and blue low thresholds 199, together with the red, green, and blue scale factors 200 are determined by the CPU 171 after generating the histograms for each color plane via the Image Histogram Unit.

Depending on whether the current pixel being processed in the pipeline is red, green, or blue, the appropriate low threshold and scale factor is multiplexed into the subtract unit and multiply unit, with the output written to the appropriate color plane in Buffer A.

The Subtract unit subtracts the 8-bit low Threshold value from the 8-bit Image RAM pixel value, and has a floor of 0. The 8-bit result is passed on to the specialized 8×8 multiply unit, which multiplies the 8-bit value by the 8-bit scale factor (8 bits of fraction, integer=1). Only the top 10 bits of the result are kept, and represent 8 bits of integer and 2 bits of fraction. The multiplier has a result ceiling of 255, so if any bit higher than bit 7 would have been set as a result of the multiply, the entire 8-bit integer result is set to 1s, and the fractional part set to 0.

Apart from the subtraction and multiply units, the majority of work in this unit is performed by the Address Generator 201, which is effectively the state machine for the unit. The address generation is governed by two factors: on a given cycle, only one access can be made to the Image RAM, and on a given cycle, only one access can be made to Buffer A. Of the 72 available cycles, 3 sets of 16 cycles are used by the Resampler for reading Buffer A. The actual usage is 3 sets of 24 cycles, with 16 reads followed by 8 wait cycles. That gives a total of 24 available cycles for 23 writes (6 red, 6 blue, 11 green). This means the two constraints are satisfied if the timing of the writes to Buffer A coincide with the wait cycles of the Resampler.

Buffer A holds the white-balanced and range-expanded pixels at the original capture spatial resolution. Each pixel is stored with 10 bits of color resolution, compared to the Image RAM image storage color resolution of 8 bits per pixel.

Buffer A is arranged as three separately addressable buffers 192*r*, 192*g*, 192*b*—one for each color plane of red, green, and blue.

During the course of 72 cycles, 16 entries are read from each of the three buffers three times by the Resampling process, and up to 29 new values are written to the three buffers (the exact number depends on the scale factor and the current sub-pixel position during resampling). The buffers must be wide enough so that the reading and writing can occur without interfering with one another. During the read process, four pixels are read from each of six rows. On average each input pixel is used twice.

The green plane has a D value of 0.5 for resampling, indicating that four sample positions can be contained within two CFA pixel positions. However, each row of green samples only holds every alternate pixel. This means that only four samples are required per row (worst case is 4, not 3, due to a worst case initial position). Movement in Y indicates the requirement of an additional sample column, making five. Finally, an additional sample column is required for writing. This gives a total of six samples per row. Seven rows are required for a single sample. To generate the three sets of RGB pixels for each X position, the maximum movement in Y will be two rows. Movement in X adds one sample row above and below. Consequently a total of 11 rows are required.

The red and blue planes have a D value of 0.5 for resampling, indicating that 4 locations can be contained within two samples. Four samples per row are required for the resampling process, which is further increased to six samples to match the green plane (for startup purposes). Six rows are required to cater for movement in Y.

Each sub-buffer is implemented as a RAM with decoding to read or write a single 10-bit sample per cycle. The sub-buffers are summarized in the following table, and consume less than 175 bytes.

Sub-Buffer Summary

| Buffer | Composition | Bits |
|---|---|---|
| Red Buffer | 6 rows × 6 samples × 10-bits | 360 |
| Blue Buffer | 6 rows × 6 samples × 10-bits | 360 |
| Green Buffer | 11 rows × 6 samples × 10 bits | 660 |

The Resample process is responsible for generating the full complement of R, G, and B pixels for each CFA coordinate by appropriate resampling of the white-balanced and range-expanded R, G, and B planar images.

The time allowed for producing the components of R, G, and B is 72 cycles. However we must effectively produce RGB values for three pixel coordinates: the pixel in question, and the pixel above and below. Thus we have 72 cycles in which to calculate three RGB samples.

Buffering RGB values to save recalculation requires too much memory, and in any case, there is sufficient time to generate the RGB values.

The resampling process can be seen as three sets of RGB generation, each of which must be completed within 24 cycles (for a total maximum elapsed time of 72 cycles). The process of generating a single RGB value can in turn be seen as three processes performed in parallel: the calculation of R, the calculation of G, and the calculation of B, all for a given pixel coordinate. This is effectively running three image reconstruction filters, one on each channel of the image. In the case of the image processor 170 we perform image reconstruction with five sample points, requiring four coefficients in a convolution kernel (since one coefficient is always 0 and thus the sample point is not required).

Figure 21:
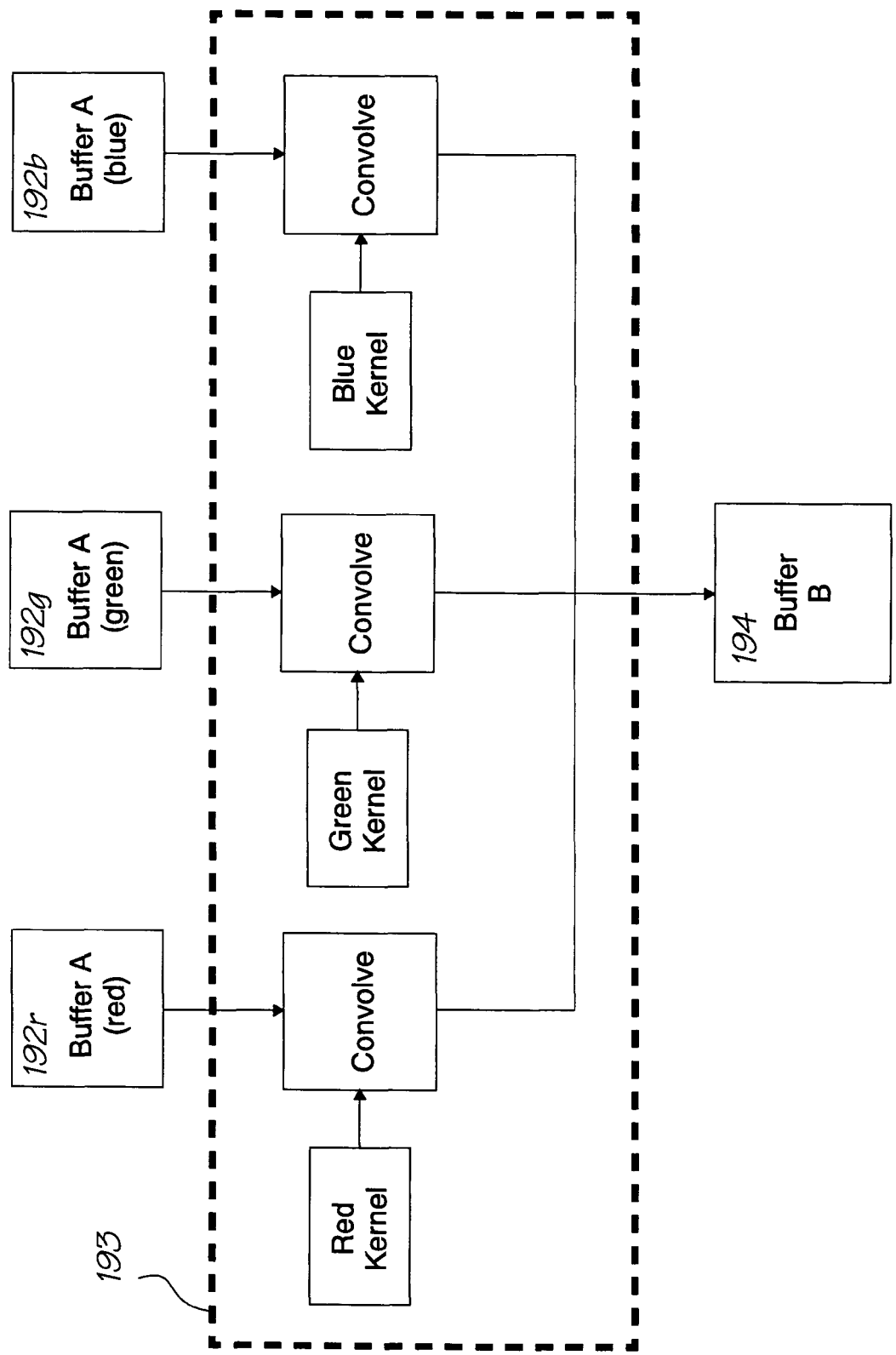
FIG. 21 is a block diagram of the resample process.

Consequently, calculation of the medium resolution R pixel is achieved by running an image reconstruction filter on the R data. Calculation of the medium resolution G pixel is achieved by running an image reconstruction filter on the G data, and calculation of the medium resolution B pixel is achieved by running an image reconstruction filter on the B data. Although the kernels are symmetric in x and y, they are not the same for each color plane. R and B are likely to be the same kernel due to their similar image characteristics, but the G plane, due to the rotation required for image reconstruction, must have a different kernel. A high level view of the process can be seen in FIG. 21.

The resampling process can only begin when there are enough pixels in Buffer A for the current pixel line being generated. This will be the case once four columns of data have been written to each of the color planes in Buffer A. The Resampling process must stall that time.

To calculate given color plane's medium resolution pixel value, we have 24 cycles available. To apply the kernel to the 4×4 sample area, we apply a 1D kernel (indexed by x) on each of the four rows of four input samples. We then apply the 1D kernel (indexed by y) on the resultant four pixel values. The final result is the output resampled pixel. Applying a single coefficient each cycle gives a total of 16 cycles to generate the four intermediate values, and four cycles to generate the final pixel value, for a total of 20 cycles.

With regards to precision, the input pixels are each 10 bits (8:2), and kernel coefficients are 12 bits. We keep 14 bits of precision during the four steps of each application of the kernel (8:6), but only save 10 bits for the result (8:2). Thus the same convolve engine can be used when convolving in x and y. The final output of R, G, or B is only 8 bits.

The process of resampling then, involves 20 cycles, as shown in the following table. Note that Row 1, Pixel 1 etc. refers to the input from Buffer A, and is taken care of by an Address Generator.

The 20 Cycle Resample

| Cycle | Kernel | Apply Kernel to: | Store Result in |
|---|---|---|---|
| 1 | X[1] | Row 1, Pixel 1 | TMP |
| 2 | X[2] | Row 1, Pixel 2 | TMP |
| 3 | X[3] | Row 1, Pixel 3 | TMP |
| 4 | X[4] | Row 1, Pixel 4 | TMP, V1 |
| 5 | X[1] | Row 2, Pixel 1 | TMP |
| 6 | X[2] | Row 2, Pixel 2 | TMP |
| 7 | X[3] | Row 2, Pixel 3 | TMP |
| 8 | X[4] | Row 2, Pixel 4 | TMP, V2 |
| 9 | X[1] | Row 3, Pixel 1 | TMP |
| 10 | X[2] | Row 3, Pixel 2 | TMP |
| 11 | X[3] | Row 3, Pixel 3 | TMP |
| 12 | X[4] | Row 3, Pixel 4 | TMP, V3 |
| 13 | X[1] | Row 4, Pixel 1 | TMP |
| 14 | X[2] | Row 4, Pixel 2 | TMP |
| 15 | X[3] | Row 4, Pixel 3 | TMP |
| 16 | X[4] | Row 4, Pixel 4 | TMP, V4 |
| 17 | Y[1] | V1 | TMP |
| 18 | Y[2] | V2 | TMP |
| 19 | Y[3] | V3 | TMP |
| 20 | Y[4] | V4 | TMP (for output) |

Buffer B 194 holds three complete sets of RGB pixel values (10-bits per color component) for a given CFA coordinate in a double buffered format (one set of 3 RGB pixels is being read by the Color Convert process, while the other is being written to 10-bits at a time by the Resample process).

The values are moved from the first RGB buffer to the second once the Color Convert and Resample processes have both finished. This can simply be achieved by a Select bit that is toggled, rather than physically transferring the data from one set of 9 bytes to the other.

The color conversion process 195 must produce contone L*a*b* pixels for the Sharpen process within 72 cycles. Since the sharpening process only requires the L* values corresponding to the first and third RGB sets, and only requires the full L*a*b* set for the second RGB set, we have 72 cycles in which to perform 5 color conversions (three sets of RGB to L*, and 1 set each of RGB to a* and RGB to b*).

The process requires 14 cycles per color component, leading to a total of 70 cycles for five conversions (leaving 2 cycles spare).

The conversion is performed as tri-linear interpolation described in co-pending application titled Color Conversion Method for Compact Printer System. Three 17×17×17×8-bit lookup tables 202 are used for the conversion process: RGB to L*, RGB to a*, and RGB to b*.

Address generation for indexing into the lookup tables is straightforward. We use the four most significant bits of each 8-bit color component for address generation, and the four least significant bits of each 8-bit color component for interpolating between values retrieved from the conversion tables. The addressing into the lookup table requires an adder due to the fact that the lookup table has dimensions of 17 rather than 16. Fortunately, multiplying a 4-bit number X by 17 is an 8-bit number XX, and therefore does not require an adder or multiplier, and multiplying a 4-bit number by $17^2$ (289) is only slightly more complicated, requiring a single add.

Although the interpolation could be performed faster, a single adder is used to generate addresses and have a single cycle interpolation unit. Consequently it is possible to calculate the interpolation for generating a single color component from RGB in 14 cycles in interpolator 203. The process must be repeated five times, once for each color conversion. Faster methods are possible, but not necessary.

Figure 22:
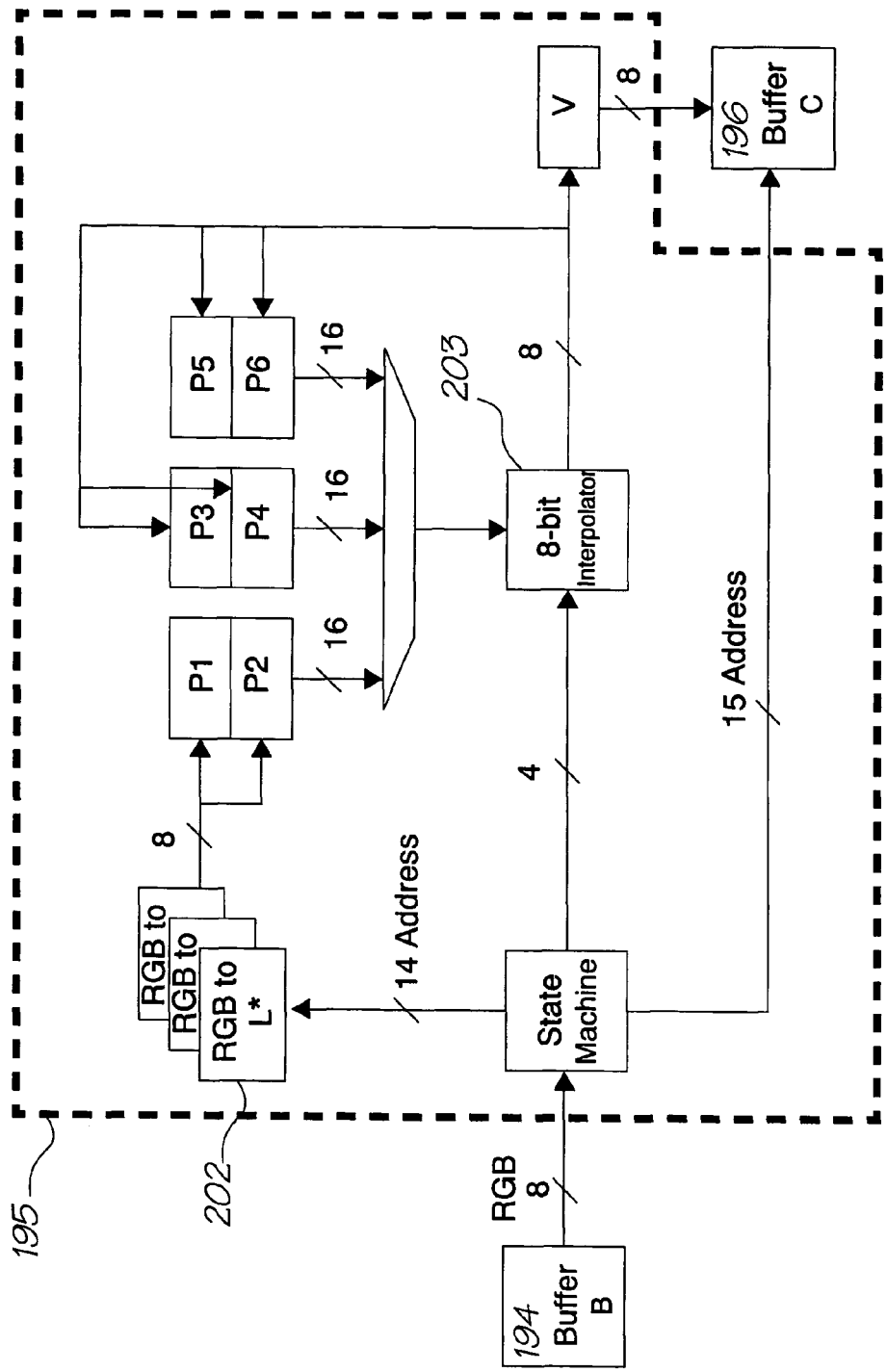
FIG. 22 is a block diagram of the color conversion process.

A block diagram of the color conversion process is shown in FIG. 22. The basic 14 cycle color conversion process is run five times as follows:

on RGB1 to generate L*1
on RGB2 to generate L*2
on RGB3 to generate L*3
on RGB2 to generate a*
on RGB2 to generate b*

Address generation for writing to Buffer C makes use of the cyclical nature of Buffer C. The address consists of a 2-bit column component (representing which of the four columns should be written to), and a 3-bit value representing L*1, L*2, L*3, a*, or b*. The column number starts at 0 each new line and increments (with wrapping) every 72 cycles.

Buffer C 196 accepts the output from the Color Convert process 195, where a complete L*a*b* pixel is generated from the RGB equivalent for a given pixel coordinate. Buffer C is used by the Sharpen process 197, which requires a 3×3 set of luminance values centered on the pixel being sharpened.

Consequently, during the sharpening process, there is need for access to the 3×3 array of luminance values, as well as the corresponding a*b* value for the center luminance pixel. At the same time, the next three L*a*b* values must be calculated from the RGB values by the Color Convert process.

The actual implementation of Buffer C is simply as a 4×5 (20 entry) 8-bit RAM, with the addressing on read and write providing the effective shifting of values. A 2-bit column counter can be incremented with wrapping to provide a cyclical buffer, which effectively implements the equivalent of shifting the entire buffer's data by 1 column position. The fact that the fourth column of a*b* data is not required is not relevant, and merely uses 2 bytes at the saving of not having to implement complicated shift and read/write logic. In a given cycle, the RAM can either be written to or read from. The read and write processes have 72 cycles in which to complete in order to keep up with the transmission process.

The Sharpen Unit 197 performs a sharpening process which involves a highpass filter of the luminance channel of the image (the L* channel). The highpass filter used is a basic highpass filter using a 3×3 convolution kernel.

The high pass filter is calculated over ten cycles. The first cycle loads the temporary register with eight times the center pixel value (the center pixel shifted left by 3 bits). The next eight cycles subtract the remaining eight pixel values, with a floor of 0. Thus the entire procedure can be accomplished by an adder. Cycle 10 involves the multiplication of the result by a constant. This constant is the representation of 1/9, but is a register to allow the amount to be altered by software by some scale factor.

Figure 23:
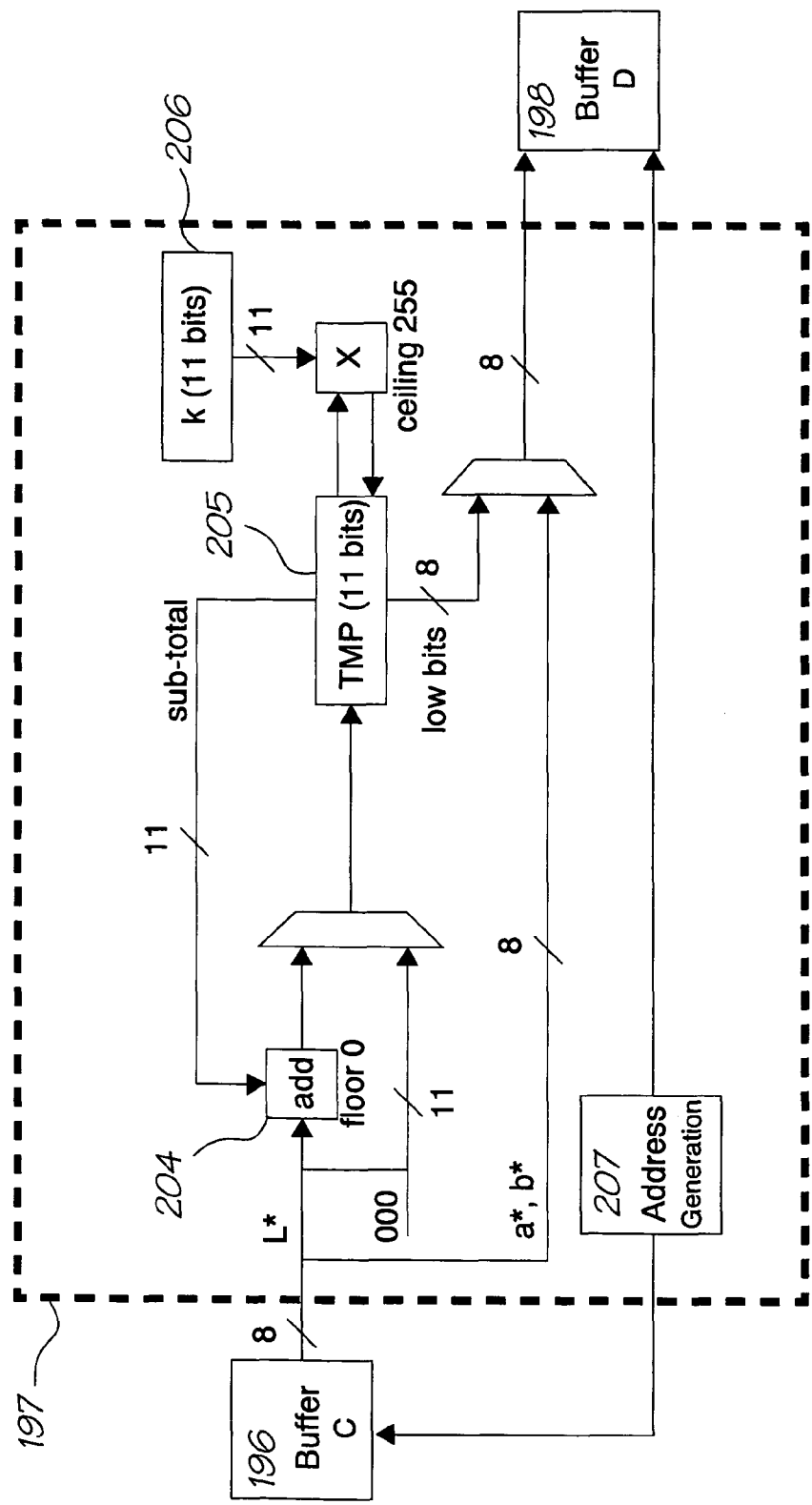
FIG. 23 is a block diagram of the sharpen process.

The resultant sharpened L* is written out to Buffer D 198 during cycle 11, and the a*, and b* color components are copied to Buffer D during cycles 12 and 13. The structure of the Sharpen unit can be seen in FIG. 23.

The adder unit 204 connected to Buffer C is a subtractor with a floor of 0. TMP 205 is loaded with 8× the first L value during cycle 0 (of 75), and then the next 8 L values are subtracted from it. The result is not signed, since the subtraction has a floor of 0.

During the 10th cycle (Cycle 9), the 11 bit total in TMP is multiplied by a scale factor 206 (typically 1/9, but under software control so that the factor can be adjusted) and written back to TMP. Only 8 integer bits of the result are written to TMP (the fraction is truncated), so the limit from the multiply unit is 255. If a scale factor of 1/9 is used, the maximum value written will be 226 (255×8/9). The scale factor is 8 bits of fraction, with the high bit representing 1/8.

Address Generation 207 is straightforward. Writing to Buffer D is simply L*, a*, and b* in cycles 11, 12, and 13 respectively. Reading from Buffer C makes use of the cyclical nature of Buffer C. The address consists of a 2-bit column component (representing which of the four columns should be read), and a 3-bit value representing L*1, L*2, L*3, a*, or b*. The column number starts at 1 each line and increments (with wrapping) every 72 cycles.

Sharpening can only begin when there have been sufficient L*a*b* pixels written to Buffer C (so that the highpass filter is valid). The sharpen process must therefore stall until the color conversion process has written three columns of data to Buffer C.

Buffer D 198 holds a complete L*a*b* pixel value (8-bits per color component) ready to be transmitted by the Serial Bus Interface 176 to the Printer Module 10. Buffer D is a double buffered format (one L*a*b* pixel is being read by the Serial Bus Interface process, while the other is being written to by the Sharpen process during a 72 cycle period).

The values are moved from the first buffer to the second once the Serial Bus Interface has transmitted all 24 bits of L*a*b*. As with Buffer B, the double buffering can simply be achieved by a Select bit that is toggled, rather than physically transferring the data from one set of 3 bytes to the other. The Serial Bus Interface supplies the WriteEnable signal for the transfer.

It will be appreciated that the processes described herein are simple operations on each value stored in an array of values. Address generation satisfies the requirements of accessing array locations in the appropriate order for reading and writing.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. An image processor for a camera module having an image sensor that captures an image, said image processor comprising:
    a central processing unit;
    program memory, associated with said central processing unit, said program memory, storing program steps for execution by said central processing unit to operate said camera module to capture said image;
    one or more interface units communicating with components of said camera module;
    image storage memory storing said image;
    an image capture unit in communication with said image storage memory, said central processing unit, and said image sensor, said image capture unit capturing said image from said image sensor and storing said image in said image storage memory; and
    image processing units, being application specific integrated circuits, in communication with said image storage memory, to transform said image into a CIE L*a*b* color space; and
    a serial bus interface communicating said transformed image with a Serial Bus of a compact printer module interconnected with the camera module, the camera module receiving operational power only from the printer module via the Serial Bus.

2. The image processor of claim 1 further comprising scratch memory associated with said central processing unit for variable storage.

3. The image processor of claim 2 wherein said scratch memory is no greater than 2 Kbytes.

4. The image processor of claim 1 wherein said serial bus interface is in communication with one or more further modules, said Serial Bus communicating power and data between said camera module and said one or more further modules.

5. The image processor of claim 4 wherein said data includes image data transformed by said image processing units.

6. The image processor of claim 1 wherein said central processing unit is a micro-controller running at about 1 Mhz.

7. The image processor of claim 1 wherein at least one of said one or more interface units is a parallel interface unit communicating with a take button for initiating capture of an image by said image capture unit.

8. The image processor of claim 1 wherein said image storage memory is less than 1 Mbytes.

9. The image processor of claim 8 wherein said image storage memory is approximately 0.5 Mbytes.

10. The image processor of claim 1 wherein said program memory is no greater than 8 Kbytes.

11. The image processor of claim 1 wherein said image processing units include an image histogram unit and an image enhancement unit.

12. The image processor of claim 11 wherein said image enhancement unit includes a white balance and range expansion unit, resample unit, color conversion unit and a sharpen unit.

* * * * *